United States Patent
Gordon

(10) Patent No.: US 8,009,740 B2
(45) Date of Patent: Aug. 30, 2011

(54) METHOD AND SYSTEM FOR A PARAMETRIZED MULTI-STANDARD DEBLOCKING FILTER FOR VIDEO COMPRESSION SYSTEMS

(75) Inventor: Stephen Gordon, North Andover, MA (US)

(73) Assignee: Broadcom Corporation, Irvine, CA (US)

( * ) Notice: Subject to any disclaimer, the term of this patent is extended or adjusted under 35 U.S.C. 154(b) by 1227 days.

(21) Appl. No.: 11/102,389

(22) Filed: Apr. 8, 2005

(65) Prior Publication Data

US 2006/0227881 A1  Oct. 12, 2006

(51) Int. Cl.
*H04N 7/12* (2006.01)
(52) U.S. Cl. .................................. 375/240.25
(58) Field of Classification Search ............... 375/240.25
See application file for complete search history.

(56) References Cited

U.S. PATENT DOCUMENTS

| | | | | |
|---|---|---|---|---|
| 2004/0151398 A1* | 8/2004 | Betrisey et al. | ............... | 382/260 |
| 2005/0063465 A1* | 3/2005 | Cote et al. | ............... | 375/240.12 |
| 2005/0094729 A1* | 5/2005 | Yuan et al. | ............... | 375/240.16 |
| 2005/0123057 A1* | 6/2005 | MacInnis et al. | ............... | 375/240.25 |
| 2005/0259879 A1* | 11/2005 | Hellman | ............... | 382/239 |

* cited by examiner

Primary Examiner — Jayanti K Patel
Assistant Examiner — Richard Torrente
(74) Attorney, Agent, or Firm — McAndrews, Held & Malloy, Ltd.

(57) ABSTRACT

In a video processing system, a method and system for a parameterized multi-standard deblocking filter for video compression systems are provided. A multi-standard deblocking filter may be configured to filter a reconstructed output stream based on a selected standard mode of operation. The configured multi-standard deblocking filter may be utilized in a decoder and/or in a decoding portion of an encoder. Filtered or unfiltered reconstructed pictures may be selected for storage in a picture buffer before further processing. Filtered or unfiltered reconstructed pictures may be selected for display in a decoder or for intra-coding and inter-coding processing in the decoding portion of the encoder. Filter parameters in the multi-standard deblocking filter may be configured based on a set of side information and the selected standard mode of operation.

14 Claims, 8 Drawing Sheets

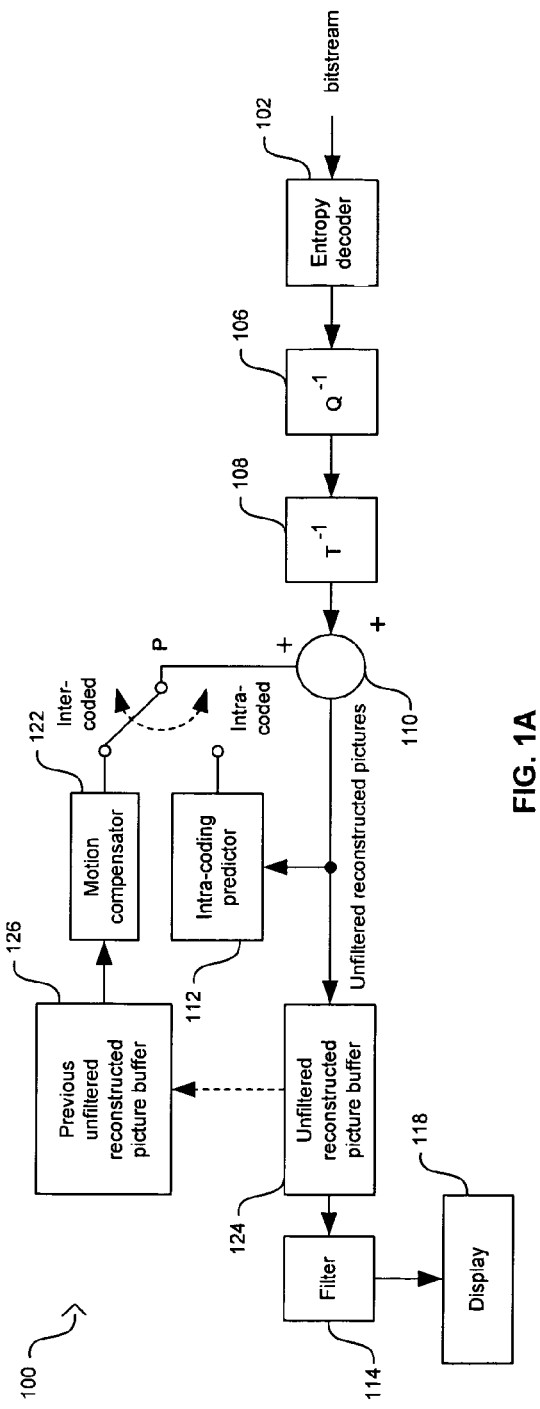
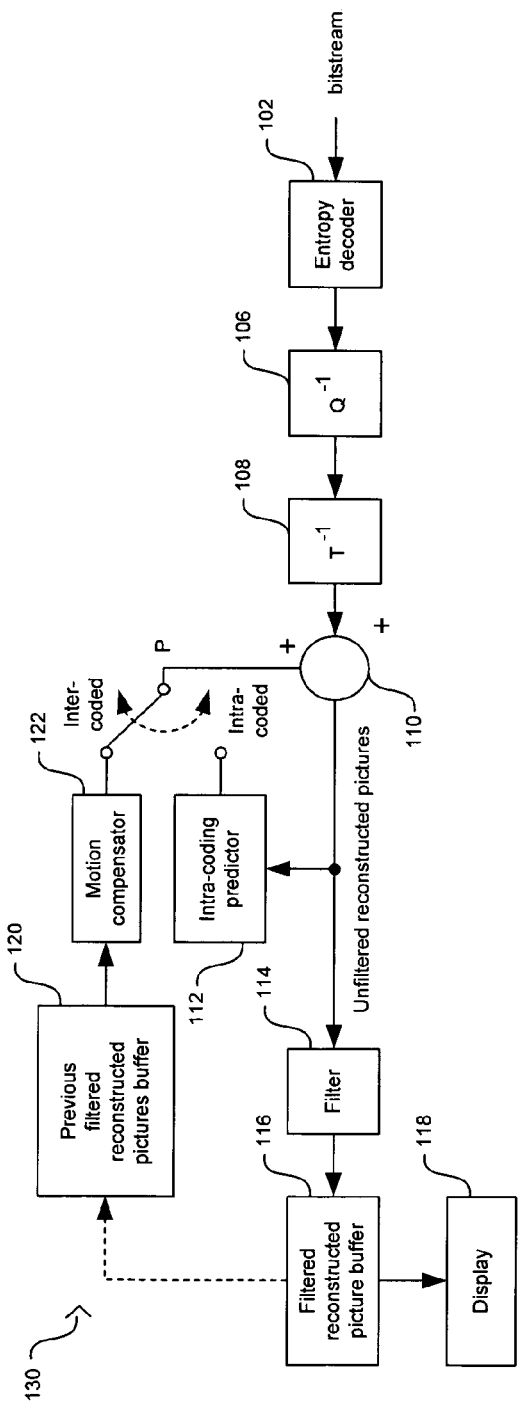
FIG. 1A
FIG. 1B

METHOD AND SYSTEM FOR A PARAMETRIZED MULTI-STANDARD DEBLOCKING FILTER FOR VIDEO COMPRESSION SYSTEMS

CROSS-REFERENCE TO RELATED APPLICATIONS/INCORPORATION BY REFERENCE

This application is related to the following applications, each of which is incorporated herein by reference in its entirety for all purposes:
U.S. patent application Ser. No. 11/000,731 filed Dec. 1, 2004;
U.S. patent application Ser. No. 10/963,677 filed Oct. 13, 2004;
U.S. patent application Ser. No. 10/985,501 filed Nov. 10, 2004;
U.S. Patent Application Ser. No. 60/573,239 filed May 21, 2004;
U.S. patent application Ser. No. 10/985,110 filed Nov. 10, 2004;
U.S. patent application Ser. No. 10/981,218 filed Nov. 4, 2004;
U.S. patent application Ser. No. 10/965,172 filed Oct. 13, 2004;
U.S. patent application Ser. No. 10/972,931 filed Oct. 25, 2004;
U.S. patent application Ser. No. 10/974,179 filed Oct. 27, 2004;
U.S. patent application Ser. No. 10/974,872 filed Oct. 27, 2004;
U.S. patent application Ser. No. 10/970,923 filed Oct. 21, 2004;
U.S. patent application Ser. No. 10/963,680 filed Oct. 13, 2004;
U.S. patent application Ser. No. 11/013,768 filed Dec. 16, 2004;
U.S. Patent Application Ser. No. 60/573,109 filed May 21, 2004; and
U.S. patent application Ser. No. 11/000,676 filed Dec. 1, 2004.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to the decoding of video signals. More specifically, certain embodiments of the invention relate to a method and system for a parameterized multi-standard deblocking filter for video compression systems.

BACKGROUND OF THE INVENTION

In video and image compression systems, the processing of pictures may be performed in blocks of pixels, where the blocks of pixels to be processed may be of different sizes. These block-based image and video compression systems may exhibit "blocking" artifacts at the boundaries between picture blocks or macroblocks. The blocking artifacts may occur from the independent transformation and quantization of adjacent macroblocks that may result in the better reproduction of low frequency coefficients in some macroblocks than what is achieved in other macroblocks. When the macroblocks are reconstructed to reproduce the original picture, there may be a slight low frequency offset between adjacent macroblocks that may result in visible artificial edges. The intensity of the visible artificial edges may depend on the content and/or the bit rate associated with the reconstructed pictures. In order to reduce the effects of visible artificial edges in a reconstructed picture, video and image compression systems may utilize deblocking filters.

Some compression standards, for example, JPEG, MPEG-1, MPEG-2, MPEG-4 simple profile (SP), MPEG-4 advanced simple profile (ASP), and H.261, do not specify how to reduce the effects of blocking artifacts in a reconstructed macroblock or picture. In this regard, a specification is not provided either for macroblocks reconstructed in a decoder or in a decoding portion of an encoder. Systems that utilize standards that do not specify deblocking filters may be referred to as Type A compression systems. In Type A compression systems, a deblocking filter may be utilized to reduce visible artificial edges only as a non-normative post-processing step. For example, in video decoders, a deblocking filter may be utilized as a non-normative post-processing step before transferring the reconstructed pictures to be displayed by a display engine.

Other compression standards, for example, H.263 and H.264/MPEG Advanced Video Coding (AVC), may specify the utilization of a normative in-loop deblocking filter that may operate on reconstructed macroblocks that make up a reconstructed picture to remove or reduce visible artificial edges. In-loop may refer to filtering that is part of the coding or decoding operations. In this regard, the deblocking filter may be utilized in a decoder or in the decoding portion of an encoder before transferring the reconstructed picture to another component or device for further processing. Systems that utilize standards that specify in-loop and/or out-of-loop deblocking filters may be referred to as Type B compression systems.

In another example, the VC-1 advanced video codec standard may specify a normative in-loop deblocking filter. Moreover, the VC-1 advanced video codec standard may also recommend the use of an out-of-loop deblocking filtering in a decoder. In this regard, out-of-loop may refer to filtering that is not part of the coding or decoding operations. A compression system that supports the VC-1 advanced video codec standard may operate as a Type A compression system, for example, when utilizing the out-of-loop deblocking filter or as a Type B compression system, for example, when utilizing a normative in-loop deblocking filter.

The architectural and operational differences between Type A and/or Type B compressions systems, whether they are encoders, decoders, and/or encoder/decoder (CODEC) pairs, may be of significance because new integrated circuit (IC) video compression systems may be required to provide support to multiple compression standards in a single system-on-chip (SOC) solution. The cost associated with multi-standard IC video compression systems in a single SOC solution may be high because of the large chip area that may be required to provide the necessary encoders, decoders, and/or CODECs to support multiple standards in a single integrated circuit.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for a parameterized multi-standard deblocking filter for video compression systems. Aspects of the method may comprise selecting a standard mode of operation. At least one filter may be configured based on the selected standard mode of operation. Determining whether to operate as a first type compression system or as a second type compression system may also be based on the selected standard mode of operation. When operation as the first type compression system is determined, a reconstructed output stream may be processed using the configured filter. When operation as the second type compression system is determined, the reconstructed output stream may be processed without using the configured filter. A reconstructed output stream may be generated by a reconstructor and may be transferred to the configured filter from the reconstructor to the configured filter.

Operation as the first type compression system may be determined when the selected standard mode of operation is an H.263 standard mode or an H.264 standard mode, for example. A set of side information may be transferred to the configured filter. Contents and format of the transferred set of side information may correspond to the selected standard mode of operation. The transferred set of side information may be mapped to a set of filter parameters in the configured filter. The reconstructed output stream may be processed using the configured filter by utilizing the mapped transferred set of side information in the filter parameters. The processed reconstructed output stream using the configured filter may be transferred to a display engine and/or to a picture buffer.

In another aspect of the method, operation as the second type may be determined when the selected standard mode of operation is a JPEG standard mode, an MPEG-1 standard mode, an MPEG-2 standard mode, an MPEG-4 SP standard mode, an MPEG-4 ASP standard mode, VC-1 standard mode, or an H.261 standard mode, for example. The reconstructed output stream may be transferred, without using the configured filter, to a display engine and/or to a picture buffer.

Aspects of the system may comprise circuitry for selecting a standard mode of operation. The system may provide circuitry for configuring at least one filter based on the selected standard mode of operation. Circuitry may be provided for determining whether to operate as a first type compression system or as a second type compression system based on the selected standard mode of operation. When operation as the first type compression system is determined, circuitry may be provided for processing a reconstructed output stream using the configured filter. When operation as the second type compression system is determined, circuitry may be provided for processing the reconstructed output stream without using the configured filter. A reconstructor may generate the reconstructed output stream and may transfer the reconstructed output stream to the configured filter.

Circuitry for operation as the first type compression system may be provided when the selected standard mode of operation is an H.263 standard mode or an H.264 standard mode, for example. Circuitry may be provided for transferring a set of side information to the configured filter. Contents and format of the transferred set of side information may correspond to the selected standard mode of operation. Circuitry may also be provided for mapping the transferred set of side information to a set of filter parameters in the configured filter. The configured filter may process the reconstructed output stream by utilizing the mapped transferred set of side information in the set of filter parameters.

In one embodiment of the system, a first decoder multiplexer may transfer the processed reconstructed output stream using the configured filter to a picture buffer. A second decoder multiplexer may transfer the processed reconstructed output stream using the configured filter to a display engine. In another embodiment of the system, a first encoder multiplexer may transfer the processed reconstructed output stream using the configured filter for intra-coding processing. A second encoder multiplexer may transfer the processed reconstructed output stream using the configured filter to a picture buffer.

In another aspect of the system, operation as the second type may be determined when the selected standard mode of operation is a JPEG standard mode, an MPEG-1 standard mode, an MPEG-2 standard mode, an MPEG-4 SP standard mode, an MPEG-4 ASP standard mode, VC-1 standard mode, or an H.261 standard mode, for example. In one embodiment of the system, a first decoding multiplexer may transfers the reconstructed output stream, without using the configured filter, to a picture buffer. A second decoding multiplexer may transfer the reconstructed output stream, without using the configured filter, to a display engine. In another embodiment of the invention, a first encoder multiplexer may transfer the reconstructed output stream, without using the configured filter, for intra-coding processing. A second encoder multiplexer may transfer the reconstructed output stream, without using the configured filter, to a picture buffer.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a block diagram of an exemplary decoding system with out-of-loop deblocking, in connection with an embodiment of the invention.

FIG. 1B is a block diagram of an exemplary decoding system with in-loop deblocking, in connection with an embodiment of the invention.

DETAILED DESCRIPTION OF THE INVENTION

Figure 2A:
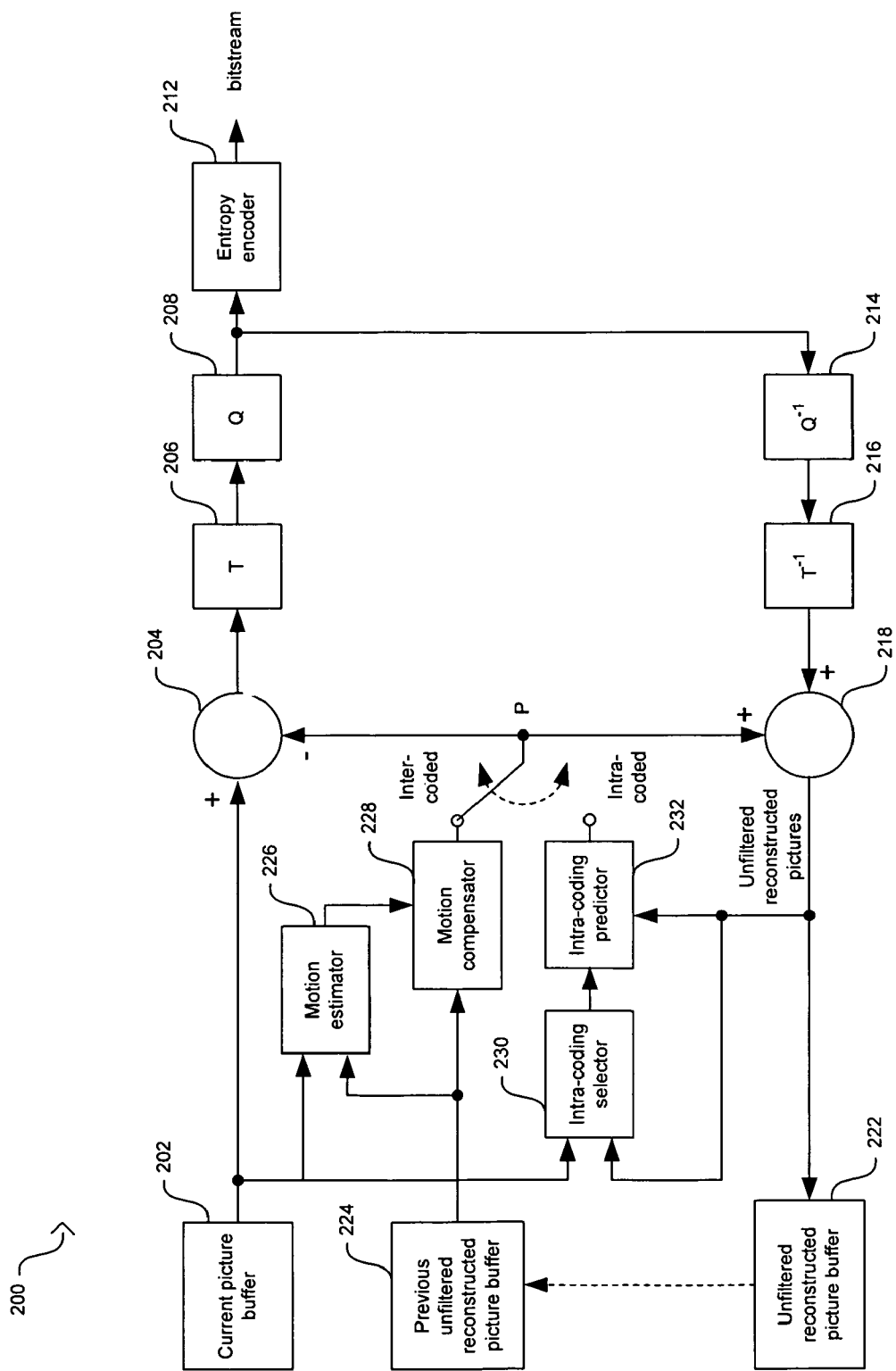
FIG. 2A is a block diagram of an exemplary encoding system without a deblocking filter in the decoding path, in connection with an embodiment of the invention.

Certain embodiments of the invention may be found in a method and system for a parameterized multi-standard deblocking filter for video compression systems. A multi-standard deblocking filter may be utilized to filter reconstructed pictures and reduce the visible artificial edges that may occur from low frequency offsets. The filter parameters of the multi-standard deblocking filter may be configured based on a selected standard mode of operation and on side information received from the incoming compressed video stream. The multi-standard deblocking filter may be utilized in Type A and Type B compression systems, whether they are decoders, encoders, or CODECs. This approach may provide sufficient architectural flexibility and area reduction to allow a cost effective SOC solution for IC video compression systems that provide support to multiple compression standards.

FIG. 1A is a block diagram of an exemplary decoding system with out-of-loop deblocking, in connection with an embodiment of the invention. Referring to FIG. 1A, a decoding system 100 with out-of-loop deblocking may comprise an entropy decoder 102, a inverse quantizer ($Q^{-1}$) 106, a inverse transformer ($T^{-1}$) 108, a digital adder 110, an intra-coding predictor 112, a filter 114, an unfiltered reconstructed picture buffer 124, a display 118, a previous unfiltered reconstructed picture buffer 126, and a motion estimator 122.

The entropy decoder 102 may decode a compressed bitstream from a generic transmission channel or a storage medium, where the decoding operation may correspond to, for example, the decoding of a variable-length encoded bitstream. The decoded bitstream may be received from a transmission channel and/or a storage medium. The decoded bitstream may be transferred to the inverse quantizer 106 for further processing. The inverse quantizer 106 and the inverse transformer 108 may rescale the decoded bitstream and perform an Inverse Discrete Cosine Transform (IDCT) to the dequantized coefficients respectively. The digital adder 110 may add a prediction macroblock P and the inverse transformed coefficients to produce unfiltered reconstructed macroblocks that make up an unfiltered reconstructed picture. The filter 114 may reduce the effects of blocking artifacts by performing, for example, a spatial low pass filtering operation. The motion compensator 122 may generate prediction macroblocks P for inter-coded pictures based on previous reconstructed pictures stored in the previous filter reconstructed picture buffer 120. The intra-coding predictor 112 may generate prediction macroblocks P for intra-coded pictures based on a current unfiltered reconstructed picture from the digital adder 110. The filtered reconstructed picture buffer 116 may store a current filtered reconstructed picture before transfer to the previous filter reconstructed picture buffer 120 for storage before further processing and/or to the display 118 for display. This approach may allow for the display of filtered reconstructed pictures that may exhibit reduced blocking artifacts.

The decoding system 100 may correspond to applications that support Type A compression systems, where the use of a non-normative deblocking filter is not specified and deblocking filtering may be provided as a post-processing step. The decoding system 100 may also correspond to applications that support Type B compression systems, where the use of an out-of-loop deblocking filter may be supported. In this regard, the design characteristics of the filter 114 may be determined and may be fixed based on the specific standard for which the decoding system 100 is to be utilized.

FIG. 1B is a block diagram of an exemplary decoding system with in-loop deblocking, in connection with an embodiment of the invention. Referring to FIG. 1B, a decoding system 130 with in-loop deblocking may comprise an entropy decoder 102, a inverse quantizer ($Q^{-1}$) 106, a inverse transformer ($T^{-1}$) 108, a digital adder 110, an intra-coding predictor 112, a filter 114, an filtered reconstructed picture buffer 116, a display 118, a previous filtered reconstructed picture buffer 120, and a motion estimator 122. The decoding system 130 with in-loop deblocking may differ from the decoding system 100 with out-of-loop deblocking in FIG. 1A in that a current unfiltered reconstructed picture may be filtered by filter 114 before storage in the filtered reconstructed picture buffer 116. This approach may allow the motion compensator 122 to generate prediction macroblocks P for inter-coded pictures based on previous filtered reconstructed pictures that may exhibit reduced blocking artifacts. The operation of the intra-coding predictor 112 may not be affected by the utilization of the filter 114.

The decoding system 130 may be utilized in applications that support Type B compression systems where the use of a normative in-loop deblocking filter is specified. In this regard, the design characteristics of the filter 114 may be determined and fixed based on the specific standard for which the decoding system 130 is to be utilized.

FIG. 2A is a block diagram of an exemplary encoding system without a deblocking filter in the decoding path, in connection with an embodiment of the invention. Referring to FIG. 2A, an encoding system 200 without deblocking filtering in the decoding path may comprise a current picture buffer 202, a first digital adder 204, a transformer (T) 206, a quantizer (Q) 208, an entropy encoder 212, a inverse quantizer ($Q^{-1}$) 214, a inverse transformer ($T^{-1}$) 216, a second digital adder 218, an unfiltered reconstructed picture buffer 222, a previous unfiltered reconstructed picture buffer 224, a motion estimator 226, a motion compensator 228, an intra-coding selector 230, and an intra-coding predictor 232.

During the encoding operation, the current picture buffer 202 may provide a current picture for encoding. Each macroblock in the current picture may be encoded in intra-coded mode or in inter-coded mode. In intra-coded mode, the intra-coding selector 230 may select between the current picture from the current picture buffer 202 and unfiltered reconstructed pictures from the second digital adder 218. The intra-coding predictor 232 may generate the predicted macroblock P based on the unfiltered reconstructed pictures and the selection made by the intra-coding selector 230. In inter-coded mode, the prediction macroblock P may be generated based on the current picture and motion-compensated prediction from one or more previous unfiltered reconstructed pictures in the previous unfiltered reconstructed pictures buffer 224. The motion compensated prediction may be provided by the motion estimator 226 and the motion compensator 228. The motion compensated prediction may be based on at least one previously encoded, decoded, and reconstructed picture which may occur before and/or after the current picture in the video sequence.

The prediction macroblock P may be subtracted from the current macroblock by the first digital adder 204 to generate a difference macroblock for use as an input to the transformer 206. The transformer 206 may perform a spatial Discrete Cosine Trasnsform (DCT) operation on the difference macroblock to generate spatial frequency coefficients. The coefficients generated by the transformer 206 may be quantized by the quantizer 208 to generate quantized coefficients that may be transferred to the entropy encoder 212 for entropy encoding. The entropy-encoded coefficients and any information necessary to decode the macroblock may comprise the compressed bitstream.

During the reconstruction operation, in an encoding path of the encoding system 200, the quantized coefficients may be rescaled and inverse transformed by the inverse quantizer 214 and the inverse transformer 216 to generate a reconstructed difference macroblock. The prediction macroblock P may be added to the reconstructed difference macroblock by the second digital adder 218 to generate the unfiltered reconstructed macroblocks that make up an unfiltered reconstructed picture.

The encoding system 200 may be utilized in applications that support Type A compression systems where the use of normative deblocking filters in the decoding path is not specified. In this regard, motion estimation, motion compensation, and intra-coding prediction processing in Type A compression systems may be performed with unfiltered reconstructed pictures that may exhibit blocking artifacts.

Figure 2B:
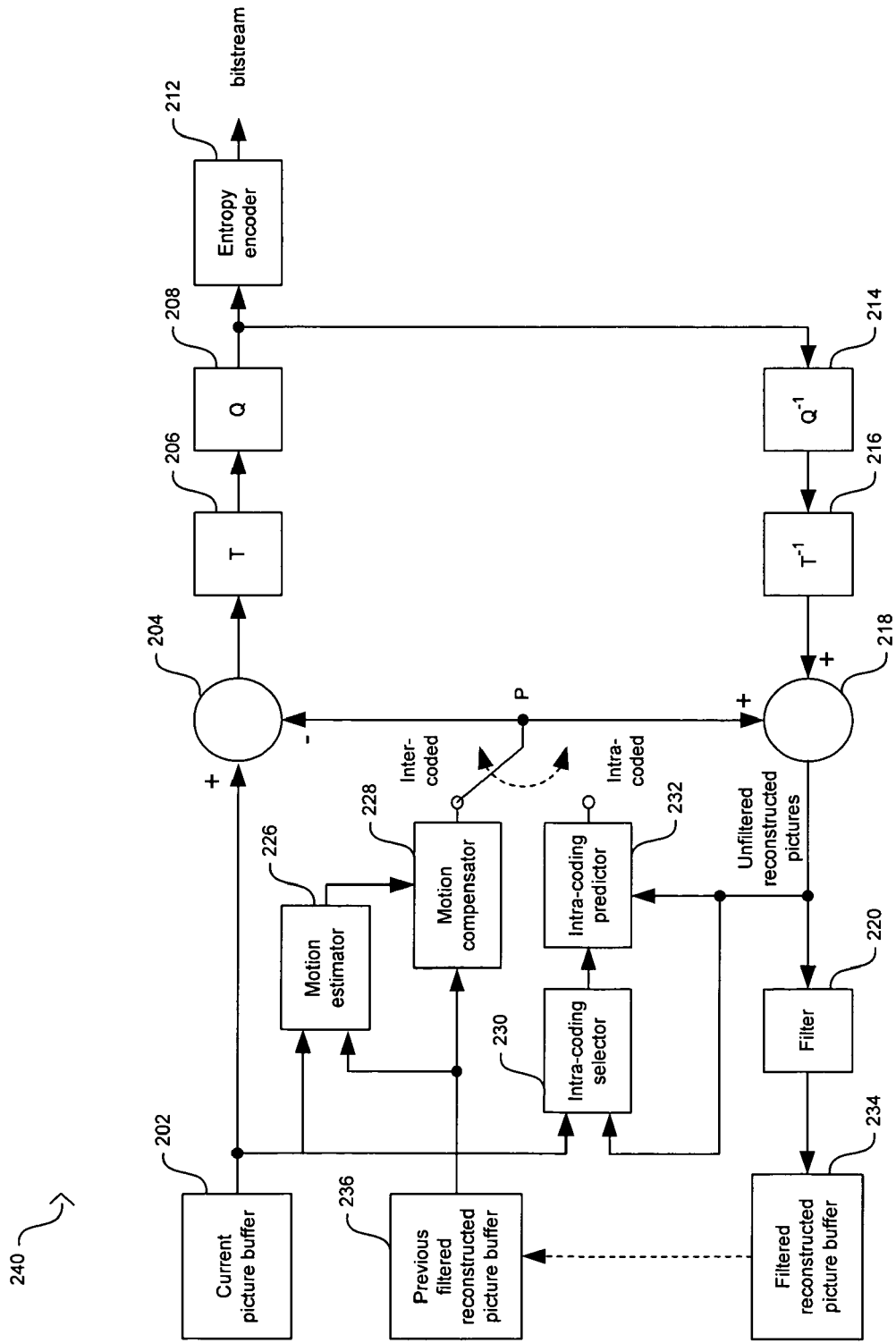
FIG. 2B is a block diagram of an exemplary encoding system with a deblocking filter in the decoding path, in connection with an embodiment of the invention.

FIG. 2B is a block diagram of an exemplary encoding system with a deblocking filter in a decoding path, in connection with an embodiment of the invention. Referring to FIG. 2B, an encoding system 240 with deblocking filtering in the decoding path may comprise a current picture buffer 202, a first digital adder 204, a transformer (T) 206, a quantizer (Q) 208, an entropy encoder 212, a inverse quantizer ($Q^{-1}$) 214, a inverse transformer ($T^{-1}$) 216, a second digital adder 218, a filter 220, a filtered reconstructed picture buffer 234, a previous filtered reconstructed picture buffer 236, a motion estimator 226, a motion compensator 228, an intra-coding selector 230, and an intra-coding predictor 232. The encoding system 240 with deblocking filtering may differ from the encoding system 200 in FIG. 2A in that a current unfiltered reconstructed picture may be filtered by filter 220 before storage in the filtered reconstructed picture buffer 234. This approach may allow the motion estimator 226 and the motion compensator 122 to generate prediction macroblocks P for inter-coded pictures based on previous filtered reconstructed pictures that exhibit reduced blocking artifacts.

The encoding system 240 may be utilized in applications that support Type B compression systems where the use of a normative in-loop deblocking filter is specified. In this regard, the design characteristics of the filter 220 may be determined and fixed based on the specific standard for which the encoding system 240 is to be utilized.

Figure 3:
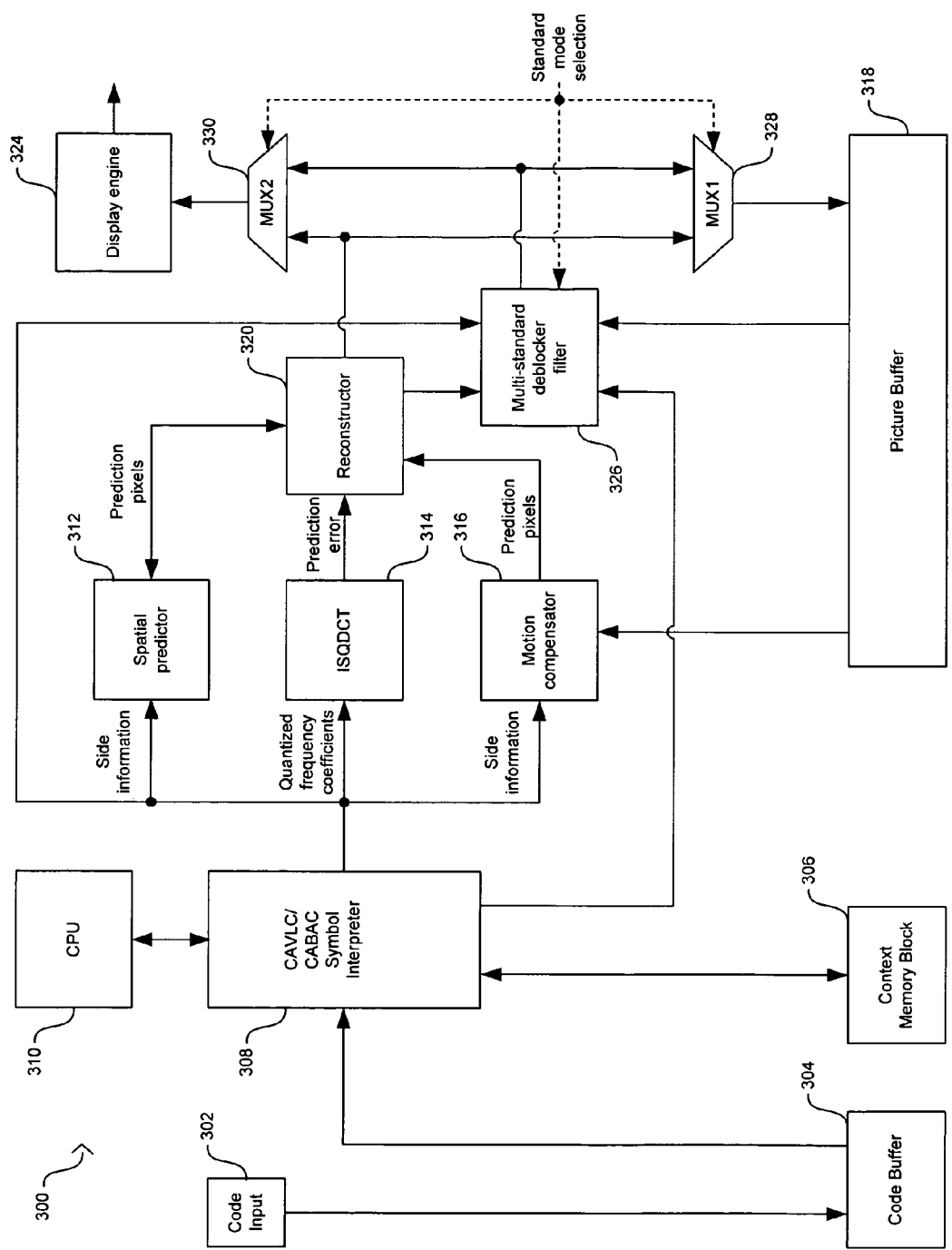
FIG. 3 is a block diagram of an exemplary implementation of an H.264-based multi-standard decoder with a multi-standard deblocking filter, in accordance with an embodiment of the invention.

FIG. 3 is a block diagram of an exemplary implementation of an H.264-based multi-standard decoder with a multi-standard deblocking filter, in accordance with an embodiment of the invention. Referring to FIG. 3, the video decoder 300 may comprise a code input 302, a code buffer 304, a symbol interpreter 308, a context memory block 306, a CPU 310, a spatial predictor 312, an inverse scanner, quantizer, and transformer (ISQDCT) 314, a motion compensator 316, a reconstructor 320, a multi-standard deblocker filter 326, a picture buffer 318, a display engine 324, a first multiplexer (MUX1) 328, and a second multiplexer (MUX2) 330.

The code buffer 302 may comprise suitable circuitry, logic and/or code that may be adapted to receive and buffer a compressed video stream from the code input 302 prior to interpreting it by the symbol interpreter 308. The compressed video stream may be encoded in a binary format using CABAC or CAVLC, for example. Depending on the encoding method, the code buffer 304 may be adapted to transfer portions of different lengths of the compressed video stream as may be required by the symbol interpreter 308. The code buffer 304 may comprise a portion of a memory system, such as a dynamic random access memory (DRAM).

The symbol interpreter 308 may comprise suitable circuitry, logic and/or code that may be adapted to interpret the compressed video stream to obtain quantized frequency coefficients information and additional side information necessary for decoding of the compressed video stream. The symbol interpreter 308 may also be adapted to interpret either CABAC or CAVLC encoded video stream, for example. In one aspect of the invention, the symbol interpreter 308 may comprise a CAVLC decoder and a CABAC decoder. Quantized frequency coefficients determined by the symbol interpreter 308 may be communicated to the ISQDCT 314, and the side information may be communicated to the motion compensator 316 and the spatial predictor 312. Depending on the prediction mode for each macroblock associated with an interpreted set of quantized frequency coefficients, the symbol interpreter 308 may provide side information either to a spatial predictor 312, if spatial prediction was used during encoding, or to a motion compensator 316, if temporal prediction was used during encoding. The side information may comprise prediction mode information and/or motion vector information, for example.

The symbol interpreter may also provide side information to the multi-standard deblocking filter 326. When the multi-standard deblocking filter 326 is based on the normative deblocking filter specified by the H.264 standard, the side information may comprise prediction mode information, motion vector information, quantization parameter information, and/or boundary pixel values to determine the strength of the deblocking filter across, for example, 4×4 edge boundaries. When the multi-standard deblocking filter 326 is based on the normative deblocking filter specified by the H.263 standard, the side information may comprise quantization parameter information and/or boundary pixel values to determine the strength of the deblocking filter across, for example, 8×8 edge boundaries. The filter parameters of an H.264 standard-based multi-standard deblocking filter 326 may be configured based on a full set of side information comprising prediction mode information, motion vector information, and quantization parameter information to support compression systems that may utilize 8×8 boundaries, for example, H.263 and MPEG-2 based compression systems.

In order to increase processing efficiency, for example, a CPU 310 may be coupled to the symbol interpreter 308 to coordinate the interpreting process for each macroblock within the compressed video stream. In addition, the symbol interpreter 308 may be coupled to a context memory block 306. The context memory block 306 may be adapted to store a plurality of contexts that may be utilized for interpreting the CABAC and/or CAVLC-encoded bitstream. The context memory 306 may be another portion of the same memory system as the code buffer 304, or a portion of another memory system, for example.

After interpreting by the symbol interpreter 308, sets of quantized frequency coefficients may be communicated to the ISQDCT 314. The ISQDCT 314 may comprise suitable circuitry, logic and/or code that may be adapted to generate a prediction error from a set of quantized frequency coefficients received from the symbol interpreter 308. For example, the ISQDCT 314 may be adapted to transform the quantized frequency coefficients back to spatial domain using an inverse transform. After the prediction error is generated, it may be communicated to the reconstructor 320.

The spatial predictor 312 and the motion compensator 316 may comprise suitable circuitry, logic and/or code that may be adapted to generate prediction pixels utilizing side information received from the symbol interpreter 308. For example, the spatial predictor 312 may generate prediction pixels for spatially predicted macroblocks, while the motion compensator 316 may generate prediction pixels for temporally predicted macroblocks. The prediction pixels generated by the motion compensator 316 may comprise prediction pixels associated with motion compensation vectors in previously reconstructed pictures. The motion compensator 316 may retrieve the prediction pixels from previously reconstructed pictures stored in the picture buffer 318. The picture buffer 318 may store previously reconstructed pictures that may correspond to pictures that occurred before and/or after the current picture being processed.

The reconstructor 320 may comprise suitable circuitry, logic and/or code that may be adapted to receive the prediction error from the ISQDCT 314, as well as the prediction pixels from either the motion compensator 316 or the spatial predictor 312 based on whether the prediction mode was a temporal or spatial prediction, respectively. The reconstructor 320 may then generate a reconstructed output stream where reconstructed macroblocks in the reconstructed output stream make up a reconstructed picture. The reconstructed output stream may be generated based on the prediction error and the side information received from either the spatial predictor 312 or the motion compensator 316. The reconstructed output stream may then be transferred to the multi-standard deblocker filter 326 for spatial filtering.

When the spatial predictor 312 is utilized for generating prediction pixels, reconstructed macroblocks may be communicated back from the reconstructor 320 to the spatial predictor 312. In this way, the spatial predictor 312 may utilize pixel information along a left, a corner or a top border with a neighboring macroblock to obtain pixel estimation within a current macroblock.

The multi-standard deblocker filter 326 may comprise suitable circuitry, logic and/or code that may be adapted to spatially filter the reconstructed output stream received from the reconstructor 320 to reduce blocking artifacts. These blocking artifacts may be associated with missing pixel information along one or more borders between neighboring macroblocks and/or with spatial low frequency offsets between macroblocks. A standard mode selection signal may be utilized to configure the multi-standard deblocker filter 326 according to a selected standard mode. For example, the multi-standard deblocker filter 326 may be implemented based on the specifications provided by the H.264 standard, where the specifications may support legacy and/or additional compression standards. By selecting the standard of the application of interest, the filter parameters of the multi-standard deblocker filter 326 may be configured to provide the necessary filtering operation while maintaining the corresponding format provided by the selected standard.

Other standards that may be supported by an H.264 standard-based multi-standard deblocker filter 326 may be JPEG, MPEG-1, MPEG-2, MPEG-4 simple profile (SP), MPEG-4 advanced simple profile (ASP), H.261, and H.263, for example. In this regard, the video decoder 300 may operate as a Type A compression system that supports a deblocking filter as a post-processing step in JPEG, MPEG-1, MPEG-2, MPEG-4 SP, MPEG-4 ASP, VC-1, and H.261 standards, and also as a Type B compression system that supports a normative in-loop deblocking filter in H.263 and H.264 standards. The filtering parameters may also be configured based on the side information provided by the symbol interpreter 308. Adapting the multi-standard deblocker filter 326 to perform either non-normative or normative filtering may provide significant system flexibility in both design and operation.

The first multiplexer (MUX1) 328 may comprise suitable logic, circuitry, and/or code that may be adapted to select whether the reconstructed output stream from the reconstructor 320 or the filtered reconstructed output stream generated by the multi-standard deblocker filter 326 may be transferred to the picture buffer 318. The standard mode selection signal may be utilized to configure the MUX2 328 to select either the reconstructed output stream or the filtered reconstructed output stream for transfer to the picture buffer 318. For example, the video decoder 300 may be adapted not to support normative in-loop deblocking filtering by selecting the reconstructed output stream from the reconstructor 320 to be transferred to the picture buffer 318. The video decoder 300 may also be adapted to support normative in-loop deblocking filtering by selecting the filtered reconstructed output stream from the multi-standard deblocking filter 326 to be transferred to the picture buffer 318.

The second multiplexer (MUX2) 330 may comprise suitable logic, circuitry, and/or code that may be adapted to select whether the reconstructed output stream from the reconstructor 320 or the filtered reconstructed output stream generated by the multi-standard deblocker filter 326 may be transferred to the display engine 324. The standard mode selection signal may be utilized to configure the MUX2 330 to select either the reconstructed output stream or the filtered reconstructed output stream for transfer to the display engine 324. For example, the video decoder 300 may be adapted not to support out-of-loop deblocking filtering by selecting the reconstructed output stream from the reconstructor 320 to be transferred to the display engine 324. The video decoder 300 may also be adapted to support out-of-loop deblocking filtering by selecting the filtered reconstructed output stream from the multi-standard deblocking filter 326 to be transferred to the display engine 324.

The picture buffer 318 may be adapted to store one or more reconstructed pictures in the reconstructed output stream received from reconstructor 320 through the MUX1 328. The picture buffer 318 may be adapted to store one or more filtered reconstructed pictures in the filtered reconstructed output stream received from the multi-standard deblocker filter 326 through the MUX1 328. The picture buffer 318 may also be adapted to transfer filtered and unfiltered reconstructed pictures to the motion compensator 316. In addition, the picture buffer 318 may transfer a previously filtered or unfiltered reconstructed picture back to the multi-standard deblocker filter 326 so that a current macroblock within a current picture may be spatially filtered to remove or reduce blocking artifacts.

Figure 4:
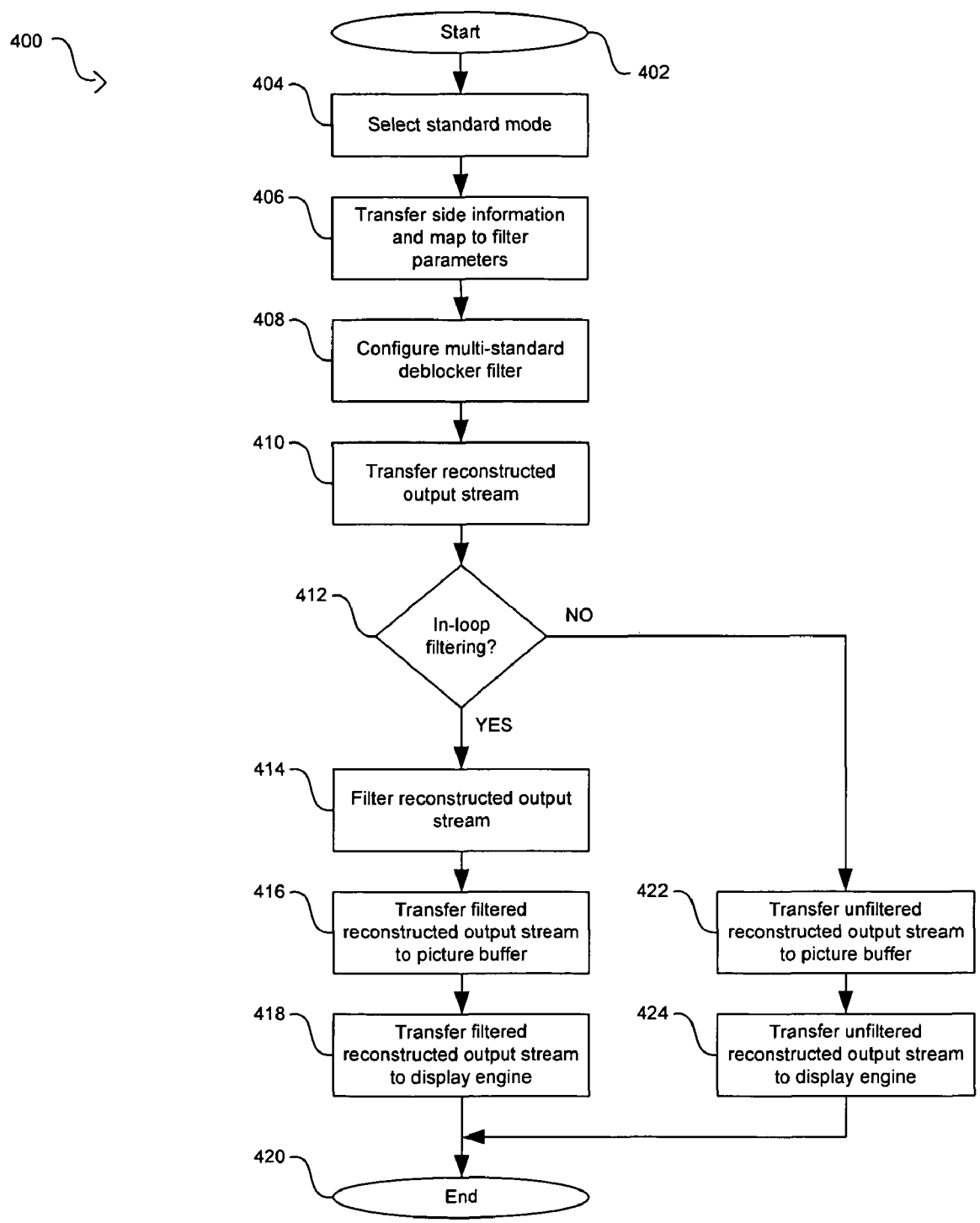
FIG. 4 is a flow diagram that illustrates the operation of an exemplary multi-standard deblocking filter of an H.264-based multi-standard decoder, in accordance with an embodiment of the invention.

FIG. 4 is a flow diagram that illustrates the operation of an exemplary multi-standard deblocking filter in an H.264-based multi-standard decoder, in accordance with an embodiment of the invention. Referring to FIG. 4, after start step 402, a standard mode of operation may be selected in step 404. The standard mode of operation may be selected from, for example, JPEG, MPEG-1, MPEG-2, MPEG-4 SP, MPEG-4 ASP, VC-1, H.261, H.263, and H.264 standards, in accordance with the standards supported by the multi-standard deblocker filter 326 in FIG. 3. In this regard, the multi-standard deblocker filter 326 may be based on specifications provided by the H.264 standard for deblocking filters, for example, to provide a broad level of compatibility with legacy and/or additional compression standards. In step 406, side information that corresponds to the selected standard mode of operation may be transferred to the multi-standard deblocker filter 326 from the symbol interpreter 308. The side information may be mapped to filter parameters, where the filter parameters may correspond to those of a spatial digital filter that complies with the specification provided in the H.264 standard for deblocking filters. In step 408, the multi-standard deblocker filter 326 may be configured, based on the side information and the selected standard mode of operation provided by the standard mode selection signal. In step 410, the reconstructed output stream may be transferred from the reconstructor 320 to the multi-standard deblocker filter 326.

In step 412, the video decoder 300 may determine, based on the selected standard mode of operation, whether the decoding operation may utilize in-loop deblocking filtering. When the video decoder 300 performs the decoding operation with an in-loop deblocking filter, the multi-standard deblocker filter 326 may filter the reconstructed output stream in step 414. In this regard, in-loop filtering may be performed by Type B compression systems since Type B compression systems define in-loop deblocking filtering as a normative operation in the decoding process. The filtering operation in step 414 may be performed by utilizing the mapped filter parameters in the multi-standard deblocker filter 326 in accordance with the side information provided by the symbol interpreter 308. In step 416, the filtered reconstructed output stream from the multi-standard deblocker filter 326 may be transferred to the picture buffer 318 via the MUX1 328. In step 418, the filtered reconstructed output stream may also be transferred to the display engine 324 for display via the MUX2 330. The end step 420 may be reached after the filtered reconstructed output stream is transferred to the display engine 324.

Returning to step 412, when the video decoder 300 performs the decoding operation without in-loop deblocking filtering, the reconstructed output stream from the reconstructor 320 may be transferred to the picture buffer 318 via the MUX1 328 in step 422. In step 424, the reconstructed output stream stored may also be transferred to the display engine 324 for display via the MUX2 330. The end step 420 may be reached after the reconstructed output stream is transferred to the display engine 324.

Out-of-loop deblocking in the video decoder 300 may also be performed. In this regard, the reconstructed output stream from the reconstructor 320 may be transferred to the picture buffer 318 via the MUX1 328. The reconstructed output stream may then be transferred to the multi-standard deblocker filter 326 where filtering may occur. After filtering, the filtered reconstructed output stream from the multi-standard filter 326 may be transferred to the display engine 324 for display via the MUX 2 330.

Figure 5:
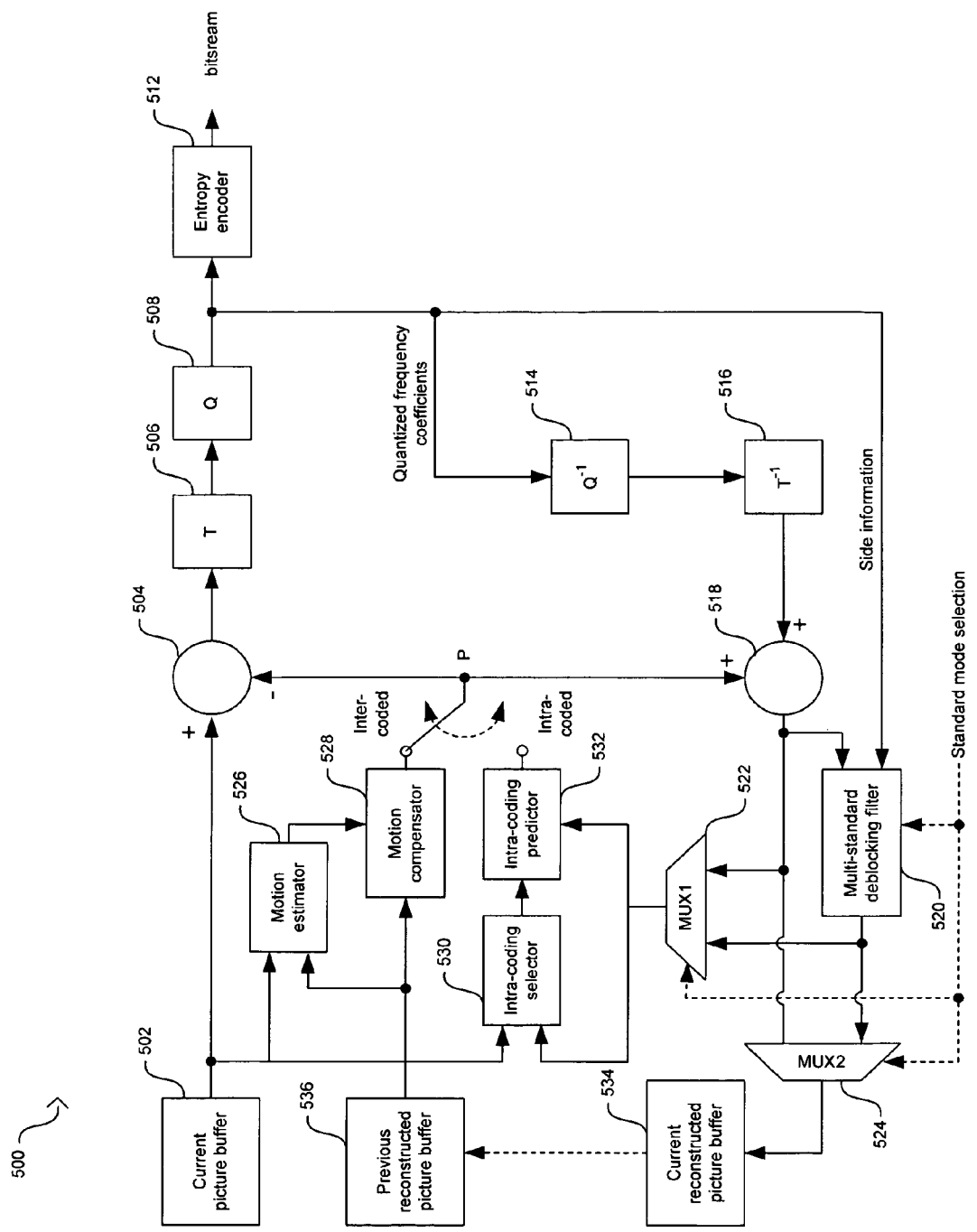
FIG. 5 is a block diagram of an exemplary H.264-based multi-standard encoding system with a deblocking filter in the decoding path, in accordance with an embodiment of the invention.

FIG. 5 is a block diagram of an exemplary H.264-based multi-standard encoding system with a deblocking filter in the decoding path, in accordance with an embodiment of the invention. Referring to FIG. 5, the encoding system 500 may comprise a current picture buffer 502, a first digital adder 504, a transformer (T) 506, a quantizer (Q) 508, an entropy encoder 512, a inverse quantizer ($Q^{-1}$) 514, a inverse transformer ($T^{-1}$) 516, a second digital adder 518, a multi-standard deblocking filter 520, a first multiplexer (MUX1) 522, a second multiplexer (MUX2) 524, a current reconstructed picture buffer 534, a previous reconstructed picture buffer 536, a motion estimator 526, a motion compensator 528, an intra-coding selector 530, and an intra-coding predictor 532.

The current picture buffer 502 may comprise suitable logic, circuitry, and/or code that may be adapted to store macroblocks of a current picture to be encoded. The previous reconstructed picture buffer 536 may comprise suitable logic, circuitry, and/or code that may be adapted to store macroblocks of previously reconstructed pictures to be utilized for spatial prediction processing. Spatial prediction processing may comprise operations performed by the motion estimator 526 and the motion compensator 528. The current reconstructed picture buffer 534 may comprise suitable logic, circuitry, and/or code that may be adapted to store macroblocks of a current reconstructed picture before transfer to the previous reconstructed picture buffer 536. The current picture buffer 502, the previous reconstructed picture buffer 536, and the current picture buffer 534 may comprise a portion of a memory system, such as a dynamic random access memory (DRAM).

The first digital adder 504 and the second digital adder 518 may comprise suitable logic, circuitry, and/or code that may be adapted to generate a difference macroblock and a reconstructed difference macroblock respectively. The difference macroblock and the reconstructed difference macroblock may be based on generated prediction macroblocks P. The first digital adder 504 may be utilized in the encoding portion or encoding path of the encoding system 500 and the second digital adder 518 may be utilized in the decoding path of the encoding system 500.

The transformer (T) 506 may comprise suitable logic, circuitry, and/or code that may be adapted to transform the spatial information in the difference macroblock to corresponding spatial frequencies using a two-dimensional or spatial Discrete Cosine Transform (DCT) operation. The quantizer (Q) 508 may comprise suitable logic, circuitry, and/or code that may be adapted to scale the spatial frequencies into quantized coefficients. The result of the scaling operation in the quantizer 508 may comprise side information, for example, inter-coding or intra-coding mode information, motion vector information, quantization parameter information, and/or boundary pixel values, which may be transferred to the reorder block 510 and/or to the multi-standard deblocking filter 520. The entropy encoder 512 may comprise suitable logic, circuitry, and/or code that may be adapted to entropy encode the quantized coefficients and the side information before transfer to the bitstream. The inverse quantizer ($Q^{-1}$) 514 may comprise suitable logic, circuitry, and/or code that may be adapted to rescale the quantized coefficients. The inverse transformer ($T^{-1}$) 516 may comprise suitable logic, circuitry, and/or code that may be adapted to inverse transform spatial frequency information to corresponding spatial information using a two-dimensional or spatial Inverse Discrete Cosine Transform (IDCT) operation.

The motion estimator 526 may comprise suitable logic, circuitry, and/or logic that may be adapted to perform motion estimation operations of current pictures from the current picture buffer 502 by utilizing previous reconstructed pictures stored in the previous reconstructed picture buffer 536. The motion compensator 528 may comprise suitable logic, circuitry, and/or logic that may be adapted to perform motion compensation operations on the motion vectors generated by the motion estimator 526 by utilizing previous reconstructed pictures stored in the previous reconstructed picture buffer 536. The motion compensator 528 may generate inter-coded prediction blocks P. The reconstructed pictures in the previous reconstructed picture buffer 536 may have been filtered by the multi-standard deblocking filter 520 when the encoding system 500 operates as a Type B compression system, that is, when the encoding operation has a normative in-loop deblocking filtering step.

The multi-standard deblocker filter 520 may comprise suitable logic, circuitry, and/or code that may be adapted to spatially filter the reconstructed output stream received from the second digital adder 518 to reduce blocking artifacts. A standard mode selection signal may be utilized to configure the multi-standard deblocker filter 520 according to a selected standard mode. For example, the multi-standard deblocker filter 520 may be implemented based on the specifications provided by the H.264 standard, where the specifications may support legacy and/or additional compression standards. By selecting the standard of the application of interest, the filter parameters of the multi-standard deblocker filter 520 may be configured to provide the necessary filtering operation while maintaining the corresponding format provided by the selected standard.

Other standards that may be supported by an H.264 standard-based multi-standard deblocker filter 520 may be JPEG, MPEG-1, MPEG-2, MPEG-4 simple profile (SP), MPEG-4 advanced simple profile (ASP), VC-1, H.261, and H.263, for example. In this regard, the encoding system 500 may be adapted to operate as a Type A compression system when it does not provide in-loop deblocking as in JPEG, MPEG-1, MPEG-2, MPEG-4 SP, MPEG-4 ASP, and H.261 standards. The encoding system 500 may also be adapted to operate as a Type B compression system when it provides a normative in-loop deblocking filtering as in H.263 and H.264 standards. The filtering parameters may also be configured based on the side information provided.

The first multiplexer (MUX1) 522 may comprise suitable logic, circuitry, and/or code that may be adapted to select whether the reconstructed output stream from the second digital adder 518 or the filtered reconstructed output stream generated by the multi-standard deblocker filter 520 may be transferred for intra-coding processing. In this regard, intra-coding processing may refer to operations performed by the intra-coding selector 530 and/or the intra-coding predictor 532. The standard mode selection signal may be utilized to configure the MUX1 522 to select either the reconstructed output stream or the filtered reconstructed output stream for transfer for intra-coding processing. For example, the encoding system 500 may be adapted not to support in-loop deblocking filtering by selecting the reconstructed output stream from the second digital adder 518 to be transferred to the intra-coding selector 530 and/or the intra-coding predictor 532. In this regard, the encoding system 500 may operate as a Type A compression system when in-loop deblocking filtering is not supported. The encoding system 500 may also be adapted to support normative in-loop deblocking filtering by selecting the filtered reconstructed output stream from the multi-standard deblocking filter 520 to be transferred to the intra-coding selector 530 and/or the intra-coding predictor 532. In this regard, the encoding system 500 may operate as a Type B compression system when in-loop deblocking filtering is supported.

The second multiplexer (MUX2) 524 may comprise suitable logic, circuitry, and/or code that may be adapted to select whether the reconstructed output stream from the second digital adder 518 or the filtered reconstructed output stream generated by the multi-standard deblocker filter 520 may be transferred to the current reconstructed picture buffer 534. The standard mode selection signal may be utilized to configure the MUX2 524 to select either the reconstructed output stream or the filtered reconstructed output stream for transfer to the current reconstructed picture buffer 534. For example, the encoding system 500 may be adapted not to support in-loop deblocking filtering by selecting the reconstructed output stream from the second digital adder 518 to be transferred to the current reconstructed picture buffer 534. In this regard, the encoding system 500 may operate as a Type A compression system when in-loop deblocking filtering is not supported. The encoding system 500 may also be adapted to support normative in-loop deblocking filtering by selecting the filtered reconstructed output stream from the multi-standard deblocking filter 520 to be transferred to the current reconstructed picture buffer 534. In this regard, the encoding system 500 may operate as a Type B compression system when in-loop deblocking filtering is supported.

The intra-coding selector 530 may comprise suitable logic, circuitry, and/or code that may be adapted to select current pictures from the current picture buffer 502 or pictures from the reconstructed output stream or from the unfiltered reconstructed output stream through the MUX1 522. The intra-coding selector 530 may receive through the MUX1 522 either the reconstructed output stream from the second digital adder 518 or the filtered reconstructed output stream from the multi-standard deblocking filter 520 when the encoding system 500 operates as a Type A compression system or as a Type B compression system respectively. The intra-coding predictor 532 may comprise suitable logic, circuitry, and/or code that may be adapted to generate intra-coded prediction macroblocks P based on the selection by the intra-coding selector 530. The intra-coding predictor 532 may receive either the reconstructed output stream from the second digital adder 518 or the filtered reconstructed output stream from the multi-standard deblocking filter 520 when the encoding system 500 operates as a Type A compression system or as a Type B compression system respectively.

Figure 6:
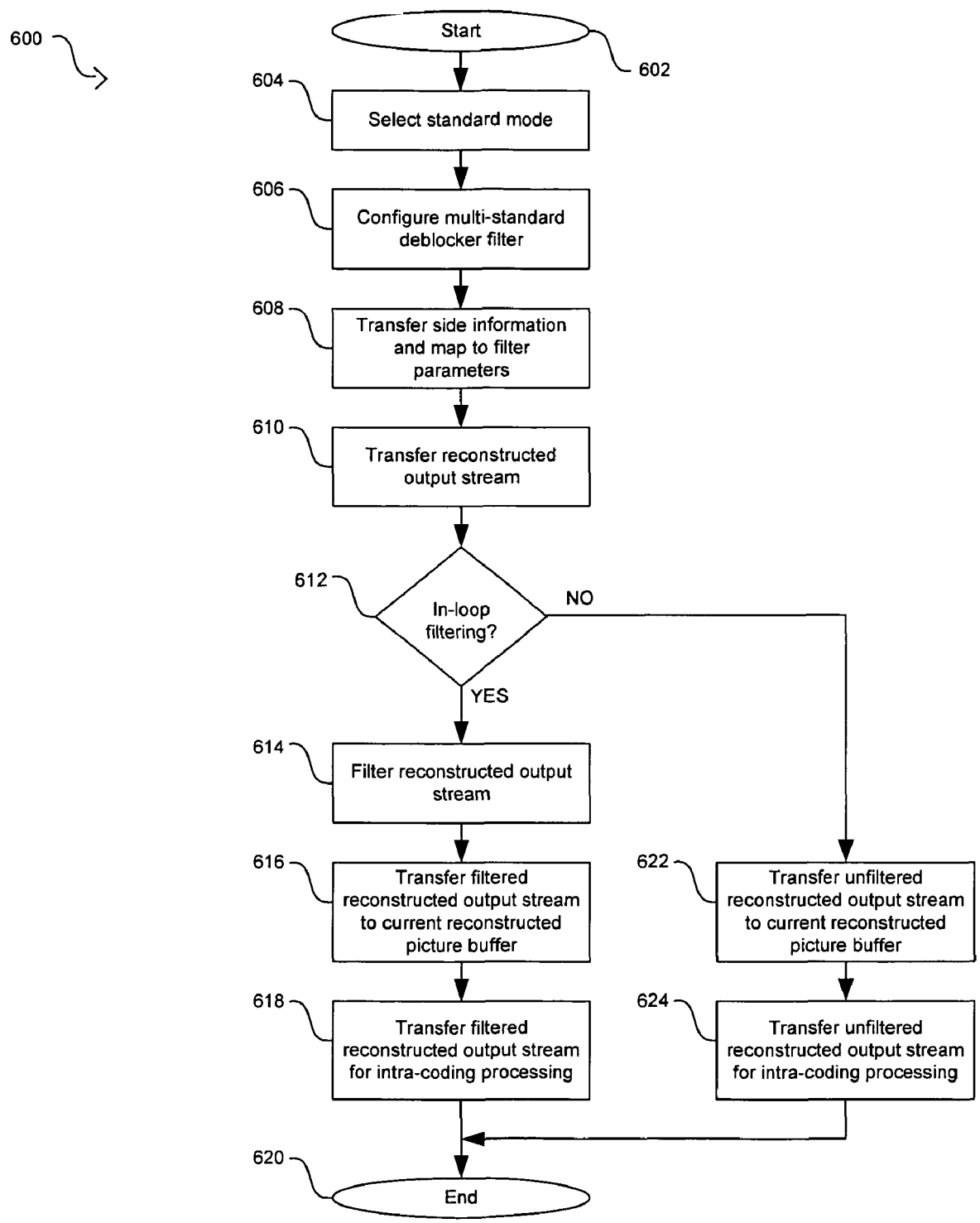
FIG. 6 is a flow diagram that illustrates the operation of an exemplary multi-standard deblocking filter in the decoding path of an H.264-based multi-standard encoding system, in accordance with an embodiment of the invention.

FIG. 6 is a flow diagram that illustrates the operation of an exemplary multi-standard deblocking filter in the decoding path of an H.264-based multi-standard encoding system, in accordance with an embodiment of the invention. Referring to FIG. 6, after start step 602, a standard mode of operation may be selected in step 604. The standard mode of operation may be selected from, for example, JPEG, MPEG-1, MPEG-2, MPEG-4 SP, MPEG-4 ASP, VC-1, H.261, H.263, and H.264 standards, in accordance with the standards supported by the multi-standard deblocker filter 520 in FIG. 5. The multi-standard deblocker filter 520 may be based on specifications provided by the H.264 standard for deblocking filters, for example. In step 606, side information that corresponds to the selected standard mode of operation may be transferred to the multi-standard deblocker filter 326. The side information may be mapped to filter parameters, where the filter parameters may correspond to those of a spatial digital filter that complies with the specification provided in the H.264 standard for deblocking filters. In step 608, the multi-standard deblocker filter 520 may be configured, based on the side information and the selected standard mode of operation provided by the standard mode selection signal. In step 610, the reconstructed output stream may be transferred from the second digital adder 518 to the multi-standard deblocker filter 520.

In step 612, the encoding system 500 may determine, based on the selected standard mode of operation, whether the encoding operation may utilize in-loop deblocking filtering. When the encoding system 500 performs the encoding operation with an in-loop deblocking filter, the multi-standard deblocker filter 520 may filter the reconstructed output stream in step 614. In this regard, in-loop filtering may be performed by Type B compression systems since Type B compression systems may define in-loop deblocking filtering as a normative operation in the encoding process. The filtering operation in step 614 may be performed by utilizing the mapped filter parameters in the multi-standard deblocker filter 520 in accordance with the side information provided. In step 616, the filtered reconstructed output stream from the multi-standard deblocker filter 520 may be transferred to the current reconstructed picture buffer 534 via the MUX2 524. In step 618, the filtered reconstructed output stream from the multi-standard deblocker filter 520 may also be transferred to the intra-coding selector 530 and/or the intra-coding predictor 532 for intra-coding processing via the MUX1 522. The end step 620 may be reached after the filtered reconstructed output stream is transferred to the current reconstructed picture buffer 534. In another embodiment, step 618 may be performed before step 616, in which case the end step 620 may be reached after the filtered reconstructed output stream is transferred for intra-coding processing. Moreover, transfer of the filtered reconstructed output stream to the current reconstructed picture buffer 534 and to the intra-coding selector 530 and/or the intra-coding predictor 532 may occur at about the same time.

Returning to step 612, when the encoding system 500 performs the encoding operation without in-loop deblocking filtering, the reconstructed output stream from the second digital adder 518 may be transferred to the current reconstructed picture buffer 534 via the MUX2 524 in step 622. In step 624, the reconstructed output stream from the second digital adder 518 may be transferred to the intra-coding selector 530 and/or the intra-coding predictor 532 for intra-coding processing via the MUX1 522. The end step 620 may be reached after the reconstructed output stream is transferred for intra-coding processing. In another embodiment, step 624 may be performed before step 622 in which case the end step 620 may be reached after the reconstructed output stream is transferred to the current reconstructed picture buffer 534. Moreover, transfer of the reconstructed output stream to the current reconstructed picture buffer 534 and to the intra-coding selector 530 and/or the intra-coding predictor 532 may occur at about the same time.

Figure 7:
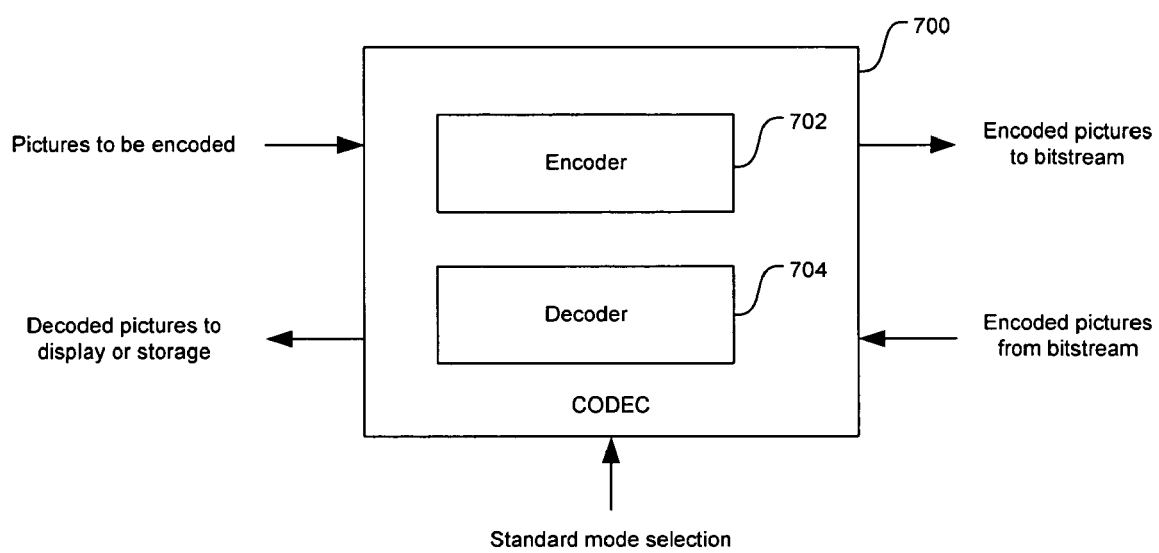
FIG. 7 is a block diagram of an exemplary CODEC system with a multi-standard deblocking filter in a decoder and the decoding path of an encoder, in accordance with an embodiment of the invention.

FIG. 7 is a block diagram of an exemplary CODEC system with a multi-standard deblocking filter in a decoder and the decoding path of an encoder, in accordance with an embodiment of the invention. Referring to FIG. 7, the CODEC system 700 may comprise an encoder 702 and a decoder 704. The encoder 702 may comprise a multi-standard deblocking filter as described in the exemplary encoding system 500 in FIG. 5. The decoder 702 may comprise a multi-standard deblocking filter as described in the exemplary video encoder 300 in FIG. 3. The multi-standard deblocking filters in the encoder 702 and the decoder 704 may have similar implementation and may be configured by a standard mode selection signal to operate in a specified compression standard. For example, the CODEC system 700 may be an H.264-based compression system and the multi-standard deblocking filters may be based on the H.264 standard specification enabling support to legacy and/or other compression standards. The CODEC system 700 may operate as Type A and/or Type B compression systems based on the specified compression standard.

The use of a multi-standard deblocking filter in Type A and Type B compression systems, whether they are decoders, encoders, or CODECs, may provide sufficient architectural flexibility and area reduction to allow cost effective SOC solutions for IC video compression systems that provides support to multiple compression standards.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video decoding, the method comprising:
determining whether a received encoded bitstream is encoded with a first type of video compression standard that uses reference frames and non-reference frames or a second type of video compression standard that uses reference frames and non-reference frames;
decompressing a portion of the received encoded bitstream with at least one decompression engine, thereby resulting in a reconstructed output stream;
writing the reconstructed output stream into a buffer memory;
applying at least one filter to the reconstructed output stream while the reconstructed output stream is stored in the buffer memory when the encoded bitstream was encoded with the first type of video compression standard, thereby resulting in a filtered reconstructed output stream;
motion compensating another portion of the received encoded bitstream with the at least one decompression engine, from the filtered reconstructed output stream when the encoded bitstream was encoded with the first type of video compression standard;
motion compensating another portion of the received encoded bitstream with the at least one decompression engine, from the reconstructed output stream when the encoded bitstream was encoded with the second type of video compression standard; and
applying at least one filter to the reconstructed output stream by a display engine while the display engine prepares the reconstructed output for display when the encoded bitstream was encoded with the second type of video compression;
processing a reconstructed output stream using at least one filter when the received encoded bitstream is encoded with a first type of video compression standard that uses reference frames and non-reference frames;
processing the reconstructed output stream without using said at least one filter when the received encoded bitstream is encoded with a second type of video compression standard that uses reference frames and non-reference frames; and
transferring said processed reconstructed output stream using said configured at least one filter to a display engine when the bitstream is encoded with the second type of video compression standard.

2. The method according to claim 1, further comprising transferring a set of side information to said at least one filter, wherein contents and format of said transferred set of side information correspond to said selected standard mode of operation.

3. The method according to claim 2, further comprising mapping said transferred set of side information to a set of filter parameters in said at least one filter.

4. The method according to claim 3, further comprising processing said reconstructed output stream using said configured at least one filter by utilizing said mapped transferred set of side information in said set of filter parameters.

5. The method of claim 1, wherein the display engine provides the reconstructed output stream to a display device.

6. The method of claim 1, wherein the display engine rasterizes the reconstructed output stream.

7. The method of claim 1, wherein the display engine scales the reconstructed output stream.

8. A system for video decoding, the system comprising:
- circuitry for determining whether a received encoded bitstream is encoded with a first type of video compression standard that uses reference frames and non-reference frames or a second type of video compression standard that uses reference frames and non-reference frames;
- at least one decompression engine for decompressing a portion of the received encoded bitstream, thereby resulting in a reconstructed output stream;
- a buffer memory for storing the reconstructed output stream into a buffer memory;
- at least one filter for filtering the reconstructed output stream while the reconstructed output stream is stored in the buffer memory when the encoded bitstream was encoded with the first type of video compression standard, thereby resulting in a filtered reconstructed output stream;
- wherein the at least one decompression engine comprises at least one motion compensator for motion compensating another portion of the received encoded bitstream from the filtered reconstructed output stream when the encoded bitstream was encoded with the first type of video compression standard;
- wherein the motion compensator motion compensates another portion of the received encoded bitstream, from the reconstructed output stream when the encoded bitstream was encoded with the second type of video compression standard; and
- a display engine for applying the at least one filter to the reconstructed output stream while preparing the reconstructed output for display when the encoded bitstream was encoded with the second type of video compression;
- circuitry for processing a reconstructed output stream using at least one filter when the received encoded bitstream is encoded with a first type of video compression standard that uses reference frames and non-reference frames; and
- circuitry for processing the reconstructed output stream without using said at least one filter when the received encoded bitstream is encoded with a second type of video compression standard that uses reference frames and non-reference frames; and
- a second decoder multiplexer transfers said processed reconstructed output stream using said configured at least one filter to a display engine when the bitstream is encoded with the second type of video compression standard.

9. The system according to claim 8, further comprising circuitry for transferring a set of side information to said at least one filter, wherein contents and format of said transferred set of side information correspond to said selected standard mode of operation.

10. The system according to claim 9, further comprising circuitry for mapping said transferred set of side information to a set of filter parameters in said at least one filter.

11. The system according to claim 10, wherein said configured at least one filter processes said reconstructed output stream by utilizing said mapped transferred set of side information in said set of filter parameters.

12. The system of claim 8, wherein the display engine provides the reconstructed output stream to a display device.

13. The system of claim 8, wherein the display engine rasterizes the reconstructed output stream.

14. The system of claim 8, wherein the display engine scales the reconstructed output stream.

* * * * *